United States Patent [19]

Moriizumi et al.

[11] Patent Number: 4,868,046
[45] Date of Patent: Sep. 19, 1989

[54] MAGNETIC RECORDING MEDIUMS COMPRISING A MODIFIED VINYL CHLORIDE RESIN BINDER IN AT LEAST A MAGNETIC RECORDING LAYER

[75] Inventors: Hirokazu Moriizumi; Hiroto Nagamine, both of Mito, Japan

[73] Assignee: Victor Company of Japan, Ltd., Japan

[21] Appl. No.: 59,258

[22] Filed: Jun. 5, 1987

[30] Foreign Application Priority Data

Jun. 7, 1986 [JP] Japan .................. 61-131109
Jul. 7, 1986 [JP] Japan .................. 61-158053

[51] Int. Cl.$^4$ .............................................. G11B 5/70
[52] U.S. Cl. ................................ 428/323; 428/329; 428/694; 428/695; 428/900
[58] Field of Search ................ 428/425.9, 694, 695, 428/328, 329, 522; 252/62.54, 62.5 Y

[56] References Cited

U.S. PATENT DOCUMENTS

| | | | |
|---|---|---|---|
| 4,152,485 | 5/1979 | Mizumura et al. | 428/425 |
| 4,521,486 | 6/1985 | Ninomiya | 428/900 |
| 4,529,661 | 7/1985 | Ninomiya | 428/329 |
| 4,594,174 | 6/1986 | Nakayama | 428/425.9 |
| 4,600,521 | 7/1986 | Nakamura | 428/329 |
| 4,612,244 | 9/1986 | Kaneda | 427/131 |
| 4,634,633 | 1/1987 | Ninomiya | 427/131 |
| 4,637,959 | 1/1987 | Ninomiya | 428/425.9 |
| 4,656,089 | 4/1987 | Ninomiya | 428/327 |
| 4,666,784 | 5/1987 | Imukai | 428/323 |
| 4,707,411 | 11/1987 | Nakayama | 428/900 |
| 4,731,292 | 3/1988 | Sasaki et al. | 428/695 |

FOREIGN PATENT DOCUMENTS 60-238309 11/1985 Japan .

Primary Examiner—Paul J. Thibodeau
Attorney, Agent, or Firm—Lowe, Price, Leblanc, Becker & Shur

[57] ABSTRACT

Magnetic recording mediums comprise a non-magnetic support and a magnetic recording layer formed on one side of the support. The magnetic recording layer comprises a magnetic powder dispersed in a specific type of vinyl chloride resin having a —SO$_3$M or group, in which M represents a monovalent metal or NH$_4$, and an epoxy group in the molecule. A back coat layer comprising the specific type of vinyl chloride resin may also be formed on the other side of the support.

21 Claims, No Drawings

MAGNETIC RECORDING MEDIUMS COMPRISING A MODIFIED VINYL CHLORIDE RESIN BINDER IN AT LEAST A MAGNETIC RECORDING LAYER

BACKGROUND OF THE INVENTION

1. Field of the Invention

This invention relates to magnetic recording mediums such as magnetic audio or video tapes, and magnetic disks such as floppy disks and hard disks. More particularly, the invention relates to an improvement in such mediums in which a specific type of modified vinyl chloride resin is used as a binder for the magnetic recording layer. The modified vinyl chloride resin may also be used as a binder for the back coat layer of such mediums.

2. Description of the Prior Art

A diversity of magnetic recording mediums, such as magnetic tapes and magnetic disks, have been proposed and are, in fact, in use. These magnetic recording mediums are, in most cases, fabricated by applying a magnetic paint containing magnetic powder, a binder resin and other additives onto a non-magnetic support and drying the applied paint to form a magnetic layer on the support. In these magnetic recording mediums, the binder resin greatly influences magnetic characteristics of the medium, the durability of the magnetic layer, and the electromagnetic conversion characteristics. Accordingly, studies have been extensively made on the binder resin by modification of existing resins.

For instance, Japanese Laid-open Patent Application No. 60-238309 describes a modified vinyl chloride resin for use as a binder for magnetic recording mediums. This vinyl chloride resin is obtained by copolymerizing a vinyl chloride monomer, a monomer having an alkali metal or ammonium salt of a strong acid containing sulfur or phosphorus, and a monomer having an epoxy group with or without other monomers copolymerizable with these monomers. The magnetic recording medium using this specific type of vinyl chloride resin as a binder of the magnetic layer shows some effects of improving characteristic properties but has not been found to be satisfactory.

SUMMARY OF THE INVENTION

It is an object of the present invention to provide an improved magnetic recording medium which comprises a specific type of modified vinyl chloride resin as a binder, in at least a magnetic recording layer.

It is another object of the invention to provide a magnetic recording medium wherein if a back coat layer is provided, the modified vinyl chloride resin mentioned above is also used as a binder for the back coat layer whereby various characteristic properties of the medium can be pronouncedly improved.

It is a further object of the invention to provide a magnetic recording medium in which a specific type of vinyl chloride resin is used in combination with an organic lubricant whereby ultrafine magnetic powders can be satisfactorily dispersed as will not be experienced in prior art magnetic paints using known binder resins.

It is a still further object of the invention to provide a magnetic recording medium which has significantly improved magnetic characteristics such as a saturation magnetic flux density, electromagnetic conversion characteristics such as Y-S/N and C-S/N values, durability, and a resistance to blocking over known counterparts.

According to one embodiment of the invention, there is provided a magnetic recording medium which comprises a non-magnetic support and a magnetic recording layer formed on one side of the support and made of a magnetic powder uniformly dispersed in a binder resin. The binder comprises a vinyl chloride resin having a $-SO_3M$ group or $-OSO_3M$ group, in which M represents a monovalent metal or a $NH_4$ group, and an epoxy group in the molecule.

According to another embodiment of the invention, the magnetic recording medium further comprises a back coat layer which comprises a vinyl chloride resin of the type mentioned above as a binder resin, by which the runnability of the magnetic medium can be improved along with recording and reproducing characteristics. The magnetic recording medium having the back coat layer rarely suffers undesirable fluctuation or damages when travelling for recording and reproducing operations.

DETAILED DESCRIPTION AND EMBODIMENTS OF THE INVENTION

As described above, the present invention is characterized by the use of a specific type of vinyl chloride resin at least as a binder for the magnetic recording layer. This vinyl chloride resin should have a $-SO_3M$ or $-OSO_3M$, in which M represents a monovalent metal or a $NH_4$ group, and an epoxy group in the molecule thereof. The content of the epoxy group is preferably in the range of from about 0.5 to 40 wt %. If the content is far less than 0.5 wt %, the resultant magnetic recording layer becomes poorer in durability and thermal stability than that using a vinyl chloride resin having the above-defined content of an epoxy group. On the contrary, over 40 wt %, the resultant magnetic recording layer becomes too hard, so that the calendering effect on the magnetic recording layer lowers.

The content of the $-SO_3M$ or $-OSO_3M$ group, in which M has the same meaning as defined above, is preferably in the range of from about 0.1 to 4 wt %. When the content is too smaller than 0.1 wt %, the dispersability of ultrafine magnetic particles is not improved to a satisfactory extent. Over 4.0 wt %, the solubility of the resultant vinyl chloride resin in a magnetic paint becomes poor and the waterproofness of the magnetic recording layer using such a vinyl chloride resin is not as improved. In the above group, M is a monovalent metal or an $NH_4$ group. Examples of the metal are alkali metals such as sodium, potassium, lithium, and the like.

The modified vinyl chloride resin used in the practice of the invention has preferably an average degree of polymerization of about 200 to 600, more preferably from about 300 to 400. Too small a degree of polymerization rarely contributes to an improvement in durability of the magnetic recording layer. On the other hand, too large a degree of polymerization does not produce a significant effect on the fluidity of a magnetic paint and also on the dispersion of a magnetic powder.

The vinyl chloride resin may be prepared by known processes including an emulsion polymerization process using starting materials such as a vinyl chloride monomer, a glycidyl ether monomer and a metal sulfite or sulfate. The conditions for the polymerization are not specific and are not described herein. Specific and preferable examples of the modified vinyl chloride resin are a vinyl chloride/allyl glycidyl ether copolymer having an —OSO₃M group or —SO₃M group, in which M has the same meaning as defined above, and an epoxy group, a vinyl chloride/glycidyl acrylate copolymer having both groups indicated above, and a vinyl chloride/methallyl glycidyl ether copolymer also having both groups indicated above.

The vinyl chloride resin is used in an amount of from about 10 to 40 parts by weight per 100 parts by weight of a magnetic powder, within which the durability of the resultant magnetic layer is satisfactorily improved and the dispersability of the magnetic powder is not impeded.

The magnetic powders useful in the present invention may be any magnetic powders ordinarily used in the art and include, for example, ferromagnetic oxide powder such as gamma-$Fe_2O_3$ and $Fe_3O_4$ with or without being deposited with Co, Ni, Mn and the like, ferromagnetic metals such as Co, Ni, Fe and alloys thereof such as Fe-Co, Fe-Ni, Co-Ni, Fe-Co-Ni, and other ferromagnetic materials such as $CrO_2$, barium ferrite and the like. These magnetic powders may be ultrafine powders having a size of 0.01 to 0.5 micrometers.

Aside from the vinyl chloride resin, the binder may further comprise any known thermoplastic resins, thermosetting resins and mixtures thereof in amounts not impeding the effects of the modified vinyl chloride resin, say, from 10 to 40 parts by weight per 100 parts by weight of the magnetic powder. Typical thermoplastic resins include: vinyl chloride copolymers such as vinyl chloride-vinyl acetate copolymers, vinyl chloride-vinylidene chloride copolymers, vinyl chloride-acrylonitrile copolymers, vinyl chloride-vinyl acetate-vinyl alcohol terpolymers and the like; other copolymer such a acrylic ester-vinylidene chloride copolymers, acrylic ester-styrene copolymers, methacrylic ester-acrylonitrile copolymers, methacrylic ester-vinylidene chloride copolymers and the like; and urethane elastomers, polyvinyl fluoride resins, cellulose derivatives such as cellulose acetate, cellulose propionate, nitro cellulose and the like, amino resins and various other synthetic resins. Examples of thermosetting resins include phenolic resins, epoxy resins, polyurethane resins, urea resins, melamine resins, alkyd resins, silicone resins, acrylic resins, isocyanate prepolymers and other various thermosetting resins.

Especially, when ultrafine magnetic powders having a very small size of 0.01 to 0.5 micrometers are used, it is preferred to use the modified vinyl chloride resin in combination with an organic additive or lubricant such as fatty acids, fatty acid esters and phosphoric esters. By the addition of such additives, the fluidity of a magnetic paint and the, electromagnetic conversion characteristics and durability of the resulting magnetic recording medium can be further improved. The fatty acids are those acids whose hydrocarbon moieties are saturated or unsaturated and have from 8 to 18 carbon atoms and include, for example, pelargonic acid, caprylic acid, undecylic acid, lauric acid, tridecylic acid, myristic acid, pentadecylic acid, palmitic acid, heptadecylic acid, stearic acid, oleic acid, undecylenic acid, linolic acid, and the like. The fatty acid esters are those acids obtained by reaction between fatty acids having saturated or unsaturated hydrocarbon groups containing from 8 to 18 carbon atoms and monovalent or higher valent fatty alcohols having saturated or unsaturated hydrocarbon groups containing from 3 to 12 carbon atoms. The fatty acids used for the esterification may be those mentioned above. The alcohols may be propyl alcohol, isopropyl alcohol, butyl alcohol, isobutyl alcohol, sec-butyl alcohol, tert-butyl alcohol, n-amyl alcohol, isoamyl alcohol, hexyl alcohol, heptyl alcohol, octyl alcohol, capryl alcohol, nonyl alcohol, decyl alcohol, undecyl alcohol, lauryl alcohol, allyl alcohol, crotyl alcohol, and the like. Glycols such as propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, pinacole, and the like are also used. Moreover, glycerine, pentaerythritol and the like polyvalent alcohols may also be used. The phosphoric acid esters are those of the following formulae

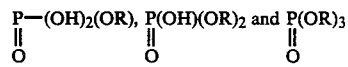

in which each R represents a saturated or unsaturated hydrocarbon group having from 3 to 16 carbon atoms. Examples of the saturated or unsaturated hydrocarbon group include a propyl group, a butyl group, a heptyl group, a hexyl group, a heptyl group, an octyl group, a nonyl group, a decyl group, a undecyl group, a dodecyl group, tridecyl group, an propenyl group, a butenyl group, an allyl group, and the like. Higher numbers of carbon atoms in the hydrocarbon group of the fatty acids, fatty acid esters and phosphoric acid esters are not favorable because the fluidity of a magnetic paint containing these organic additives is not improved. On the other hand, with a smaller number of carbon atoms, the resulting magnetic recording layer becomes plastic, so that the durability of the layer is not improved significantly.

The fatty acids, fatty acid esters and phosphoric acid esters may be used singly or in combination, and are preferably used in an amount of from about 0.1 to 10 parts by weight per 100 parts by weight of the magnetic powder and also from about 1 to 25 parts by weight per 100 parts by weight of the vinyl chloride resin.

Aside from the above ingredients, other various additives such as, for example, dispersing agents, lubricants, other abrasive powders, antistatic agents and the like, may be added to a magnetic paint mixture.

For the manufacture of the magnetic recording medium, a magnetic powder is dispersed in a resin binder comprising the modified vinyl chloride resin and a solvent for the binder by the use of a suitable mixing or kneading means. The resulting magnetic paint is coated onto a non-magnetic support on one side thereof, and is dried, and cured under conditions sufficient for the curing. If the medium is a magnetic tape, the coated layer may be calendered after drying. The coating may be effected by any known techniques such as spin coating, air knife coating, blade coating, dip coating, various roll coatings, spray coating and the like. The magnetic recording layer is generally coated in the range of from 0.5 to 10 μm.

Non-magnetic supports may be disks, films, foils or sheets of a variety of materials including, for example, synthetic or semi-synthetic resins such as polyesters, polyimides, polyphenylene sulfides, polyolefins, cellulose derivatives and the like, metals such as aluminum, magnesium, copper and the like, glasses and ceramics.

In the above embodiment, the modified vinyl chloride resin is used as a binder for the magnetic recording layer. In the practice of the invention, the modified vinyl chloride resin is very effective in improving runnability of the magnetic recording medium when also applied as a binder for a back coat layer of the medium, which is particularly a magnetic recording tape. The improved runnability leads to significantly improved recording and reproducing characteristics. The back coat layer-bearing medium has the further advantage that it rarely suffers fluctuation or damages when used as a tape.

As is well known in the art, vinyl chloride-vinyl acetate copolymers are widely used as a binder for the back coat layer, but the magnetic tape using this type of back coat layer is not satisfactory with respect to the wear resistance and toughness, giving an adverse influence on the running durability with an increasing coefficient of friction.

We have found that when the modified vinyl chloride resin described with reference to the magnetic recording layer is used as a binder for the back coat layer, the back coat layer exhibits a small coefficient of dynamic friction and is thus damaged only in a slight degree. In addition, guide pins and related parts which contact the back coat layer during running of the tape are unlikely to be soiled. The back coat layer using the modified vinyl chloride resin binder ensures good durability and good runnability, so that dropout defects are rarely produced. Accordingly, good recording and reproducing characteristics are obtained. Moreover, when placed under high temperature and high humidity conditions, the back coat layer rarely deteriorates and is substantially free of peeling off.

The modified vinyl chloride resin used in the back coat layer should have an $-SO_3M$ or $-OSO_3M$ group, in which M has the same meaning as defined before, and an epoxy group in the molecule in the amounts defined before, respectively.

For the purpose of imparting an antistatic property and a light-shielding property to the magnetic tape, it is preferred to add carbon black to the back coat layer rather than to the magnetic recording layer. This is because if carbon black is added to the magnetic recording layer, a filling rate of a magnetic powder in the magnetic recording layer has to be reduced, thus being disadvantageous from the standpoint of high density recording. Carbon black is generally liable to flocculate in a binder and has poor dispersability. Because of the presence of the $-SO_3M$ or $-OSO_3M$ group in the modified vinyl chloride resin, the dispersability of the carbon black is improved, thereby forming a back coat layer in which the carbon black is uniformly dispersed. Carbon black is preferably added to the back coat layer in an amount of 50 to 500 parts by weight per 100 parts by weight of the vinyl chloride resin.

As a matter of course, the vinyl chloride resin may be used in combination with other types of thermoplastic and/or thermosetting resin binders as set forth hereinbefore with respect to the magnetic recording layer. The vinyl chloride resin is used at least in amounts of 10 to 90 wt % of the total amount of the resin binders used.

Aside from carbon black, other inorganic particles such as calcium carbonate, titanium oxide, barium sulfate and the like may be added to the back coat layer, if necessary.

In order to facilitate the dispersability of additive powders, the organic lubricants or additives including fatty acids, fatty acid esters and/or phosphoric acid esters used in connection with the magnetic recording layer are also used in amounts of 1 to 25 parts by weight per 100 parts by weight of the vinyl chloride resin.

Formation of the back coat layer is simply effected by mixing a binder resin including the vinyl chloride resin and, if necessary, additives in an organic solvent for the binder, applying the resulting paint on a side where a magnetic recording layer is not formed or has not been formed, and drying.

The present invention is more particularly described by way of examples. Comparative examples are also described.

EXAMPLE 1

100 parts by weight of ultrafine particles of Co-containing gamma-$Fe_2O_3$ as a magnetic powder, 10 parts by weight of a vinyl chloride-allyl glycidyl ether copolymer having 0.5 wt % of an epoxy group and 2 wt % of an $-OSO_3Na$ group and an average degree of polymerization of 300, 10 parts by weight of polyurethane elastomer, 3 parts by weight of particulate $Al_2O_3$, 0.5 parts by weight of lauric acid, and 200 parts by weight of a mixed solvent of cyclohexanone and toluene in equal amounts were mixed in a sand mill for a certain time to obtain a magnetic paint. Ten parts by weight of polyisocyanate (Coronate L available from Nippon Polyurethane Ind. Co. Ltd.) were added to the magnetic paint, followed by application onto a non-magnetic polyester film support, drying, calendering and slitting into magnetic tapes or punching into floppy disks.

EXAMPLE 2

The general procedure of Example 1 was repeated using a magnetic paint having a composition of 100 parts by weight of a ferromagnetic iron powder, 15 parts by weight of a vinyl chloride/glycidyl acrylate copolymer having 1.5 wt % of an epoxy group and 1 wt % of an $-SO_3NH_4$ group and an average degree of polymerization of 400, 10 parts by weight of polyurethane elastomer, 3 parts by weight of particulate $Al_2O_3$, 5 parts by weight of butyl stearate, and 200 parts by weight of a mixed solvent of methyl ethyl ketone and toluene in equal amounts, thereby obtaining the magnetic recording mediums.

EXAMPLE 3

The general procedure of Example 1 was repeated using a magnetic paint having a composition of 100 parts by weight of a barium ferrite magnetic powder, 10 parts by weight of a vinyl chloride/methallyl glycidyl ether copolymer having 5 wt % of an epoxy group and 0.5 parts by weight of an $-OSO_3NH_4$ group, 7 parts by weight of polyurethane elastomer, 3 parts by weight of particulate $Al_2O_3$, 2 parts by weight of mono(dibutyl)acid phosphate, and 150 parts by weight of a mixed solvent of methyl ethyl ketone and toluene in equal amounts, thereby obtaining magnetic recording mediums.

EXAMPLE 4

The general procedure of Example 1 was repeated using a magnetic paint having a composition of 100 parts by weight of ultrafine magnetic particles of $CrO_2$, 10 parts by weight of a vinyl chloride/glycidyl acrylate copolymer having 20 wt % of an epoxy group and 4 wt % of an $-SO_3K$ group with an average degree of polymerization of 350, 10 parts by weight of polyurethane elastomer, 3 parts by weight of particulate $Al_2O_3$, 8 parts by weight of oleic acid, and 200 parts by weight of cyclohexanone and toluene in equal amounts, thereby obtaining magnetic recording mediums.

EXAMPLE 5

The general procedure of Example 1 was repeated except that lauric acid was not used, thereby obtaining magnetic recording mediums.

Comparative Example 1

The general procedure of Example 1 was repeated except that there was used, instead of the vinyl chloride copolymer, a vinyl chloride/vinyl acetate copolymer having 2 wt % of an —OSO$_3$Na group but being free of any epoxy group with a degree of polymerization of 300, thereby obtaining magnetic recording mediums.

Comparative Example 2

The general procedure of Example 1 was repeated except that there was used a vinyl chloride/vinyl alcohol/vinyl acetate copolymer instead of the vinyl chloride copolymer, thereby obtaining magnetic recording mediums.

The magnetic recording mediums obtained in the above examples and comparative examples were subjected to measurements with respect to the fluidity of each magnetic paint used for forming the magnetic recording layer, maximum magnetic flux density, gloss, Y-S/N, C-S/N, contamination of a magnetic head, blocking, a variation of Young's modulus of the magnetic recording layer, and the number of durability cycles for floppy disks.

The fluidity of a magnetic paint was visually observed and judged.

The maximum magnetic flux density was determined by the use of a sample vibration-type magnetometer in an applied magnetic field of 5 KOe.

The gloss was measured by setting a magnetic paint-applied sample in a glossmeter at an angle of incidence of 60°.

The Y-S/N and C-S/N values were measured by the use of a video tape recording Model HR-200 (made by Victor Of Japan, Ltd.) using a Sendant alloy magnetic head.

The contamination of a magnetic head was visually observed after running of a magnetic tape for 100 hours under conditions of 40° C. and 80% R.H.

The blocking was determined by placing each reeled magnetic tape under conditions of 60° C. and 90% R.H. for 100 hours and visually observing the resultant tape.

The variation in Young's modulus of each magnetic recording layer was expressed by a variation to an initial value.

The number of durability cycles was determined by repeatedly reproducing one spot of each disk under conditions of 52.5° C. and 30% R.H. until an output signal level reached 60% of an initial value.

The results are shown in Table 1 below.

TABLE 1

| Blocking | Variation in Young's Modulus (Kg/cm$^2$) | Number of Durability Cycles | | Fluidity | Maximum Magnetic Flux Density (gauss) | Gloss (%) | Y-S/N (dB) | C-S/N (dB) | Contamination of Head |
| --- | --- | --- | --- | --- | --- | --- | --- | --- | --- |
| nil | $-0.03 \times 10^4$ | over 20,000,000 | Example 1 | good | 1750 | 103 | +2.0 | +1.5 | nil |
| nil | $-0.05 \times 10^4$ | " | 2 | good | 3000 | 130 | +1.0 | +0.8 | nil |
| nil | $-0.02 \times 10^4$ | " | 3 | good | 1700 | 120 | +0.8 | +0.7 | nil |
| nil | $-0.08 \times 10^4$ | " | 4 | good | 1800 | 100 | +1.3 | +1.0 | nil |
| slight | $-0.2 \times 10^4$ | 10,000,000 | 5 | fair | 1400 | 80 | 0 | +0.5 | slight |
| considerable | $-3.5 \times 10^4$ | 150,000 | Com.Ex. 1 | good | 1700 | 100 | +1.3 | +0.9 | considerable |
| considerable | $-3.3 \times 10^4$ | 500,000 | 2 | good | 1450 | 80 | -0.3 | -0.1 | considerable |

As will be apparent from the above results, the magnetic paints of the examples have good or fair fluidity. Especially, when lauric acid is added, the magnetic powder can be satisfactorily dispersed with better magnetic characteristics such as the maximum magnetic flux density and better gloss along with good electromagnetic conversion characteristics such as the Y-S/N and C-S/N values. The durability of the magnetic layer is also improved along with an improved anti-blocking property and a very small variation in Young's modulus.

The results of Example 5 in which any organic additive such as a fatty acid, a fatty acid ester of a phosphoric acid ester is not used reveal that the fluidity is inferior to that of Examples 1 to 4, leading to inferior maximum magnetic flux density, magnetic characteristics and other characteristic properties. It will be thus seen that the modified vinyl chloride resin exhibits better characteristic properties when used in combination with the organic additives. However, the contamination of the magnetic head and the blocking are significantly better than those of the Comparative Examples in which vinyl chloride resins other than the resin of the present invention are used.

EXAMPLE 6

100 parts by weight of Co-containing gamma-Fe$_2$O$_3$ magnetic powder, 15 parts by weight of a vinyl chloride/allyl glycidyl ether copolymer having 4 wt % of an epoxy group and 1 wt % of an SO$_3$Na group with an average degree of polymerization of 350, 15 parts by weight of polyurethane elastomer, 3 parts by weight of particulate Al$_2$O$_3$, 1.5 parts by weight of oleic acid, and 250 parts by weight of a mixed solvent of cyclohexanone and toluene in equal amounts were mixed in a sand mill to obtain a magnetic paint. 15 parts by weight of polyisocyanate (Coronate L available from Nippon Polyurethane Ind. Co., Ltd.) was added to the magnetic paint. The paint was applied onto a non-magnetic polyester film on one side thereof, dried and calendered.

Thereafter, 100 parts by weight of carbon black having a size of 30 mμ and a specific surface area of 125 m$^2$/g, 50 parts by weight of a vinyl chloride/allyl glycidyl ether copolymer having 2.5 wt % of an epoxy group and 2 wt % of an —OSO$_3$Na group with an average degree of polymerization of 350, 50 parts by weight of polyurethane elastomer, 10 parts by weight of titanium oxide powder having an average size of 0.3 micrometers, and 500 parts by weight of a mixed solvent of cyclohexanone and toluene in equal amounts were mixed in a sand mill to obtain a paint for a back coat layer. 20 parts by weight of Coronate L were added to the paint and applied onto the other side of the polyester film in a thickness of about 1.0 micrometer, dried and slit into ½ inch wide magnetic tapes for a video tape recorder.

EXAMPLE 7

The general procedure of Example 6 was repeated using a paint having a composition of 100 parts by weight of carbon black having a size of 55 m$\mu$ and a specific surface area of 70 m$^2$/g, 50 parts by weight of a vinyl chloride/glycidyl methacrylate copolymer having 0.5 wt % of an epoxy group and 0.5 wt % of an —SO$_3$K group with an average degree of polymerization of 400, 50 parts by weight of polyurethane elastomer, 10 parts by weight of a calcium carbonate powder having an average size of 0.5 micrometers, and 500 parts by weight of a mixed solvent of cyclohexanone and toluene in equal amounts, thereby obtaining magnetic tapes.

EXAMPLE 8

The general procedure of Example 6 was repeated using a paint having a composition of 100 parts by weight of carbon black having a size of 90 m$\mu$ and a specific surface area of 23 m$^2$/g, 50 parts by weight of a vinyl chloride/glycidyl acrylate copolymer having 5 wt % of an epoxy group and 1 wt % of an —OSO$_3$NH$_4$ group with an average degree of polymerization of 300, 50 parts by weight of polyurethane elastomer, and 500 parts by weight of a mixed solvent of cyclohexanone and toluene in equal amounts, thereby obtaining magnetic tapes.

EXAMPLE 9

The general procedure of Example 6 was repeated using a paint having a composition of 100 parts by weight of carbon black having a size of 15 m$\mu$ and a specific surface area of 700 m$^2$/g, 50 parts by weight of a vinyl chloride/methallyl glycidyl ether copolymer having 20 wt % of an epoxy group and 4 wt % of an —OSO$_3$NH$_4$ group with an average degree of polymerization of 350, 50 parts by weight of polyurethane elastomer, 15 parts by weight of a barium sulfate powder having an average size of 0.4 micrometers, and 500 parts by weight of a mixed solvent of cyclohexanone and toluene in equal amounts, thereby obtaining magnetic tapes.

Comparative Example 3

The general procedure of Example 6 was repeated using, in the paint for the back coat layer, a vinyl chloride/vinyl acetate copolymer having no epoxy group but 2 wt % of an —OSO$_3$Na group, thereby obtaining magnetic tapes.

Comparative Example 4

The general procedure of Example 6 was repeated except that a vinyl chloride/vinyl acetate/vinyl alcohol copolymer was used instead of the vinyl chloride resin copolymer in the paint for the back coat layer and 5 parts by weight of stearic acid amide was further added to this paint, thereby obtaining magnetic tapes.

Comparative Example 5

The general procedure of Example 6 was repeated using a vinyl chloride/vinyl acetate copolymer in the paint for the back coat layer, thereby obtaining magnetic paints.

Comparative Example 6

The general procedure of Example 6 was repeated using a phenoxy resin in the paint for the back coat layer, thereby obtaining magnetic tapes.

The magnetic tapes obtained in the examples and the comparative examples were subjected to tests to determine a degree of defects on the back coat layer and a degree of contamination of guide pins after 500 running cycles of each tape, a coefficient of dynamic friction of the back coat layer, a degree of separation of the back coat layer after storage under conditions of 60° C. and 90% R.H. for 300 hours, and the number of dropout defects. The results are shown in Table 2 below.

The dropout defects were determined as follows: each tape was set in a PAL-type video tape recorder and run; the state where an output level was continued to drop by 20 dB over 15 microseconds was determined as one defect; and the number of such defects in one minute was counted.

TABLE 2

|  | Degree of Defects On Back Coat Layer | Contamination of Guide Pin | Coefficient of Dynamic Friction | Degree of Separation of Back Coat Layer | Dropout Defects |
| --- | --- | --- | --- | --- | --- |
| Example 6 | slight | nil | 0.178 | nil | 8 |
| 7 | slight | nil | 0.165 | nil | 10 |
| 8 | slight | nil | 0.170 | nil | 10 |
| 9 | slight | nil | 0.178 | nil | 6 |
| Com. Ex. 3 | considerable | slight | 0.412 | considerable | 55 |
| 4 | slight | considerable | 0.298 | considerable | 40 |
| 5 | considerable | considerable | 0.350 | considerable | 73 |
| 6 | slight | considerable | 0.305 | considerable | 68 |

The above results demonstrate that the magnetic recording mediums of the invention suffer only a slight degree of defects on the back coat layer when repeatedly run, without contaminating the guide pins. Thus, the back coat layers have good durability and wear resistance and are small in coefficient of dynamic friction. When placed under high temperature and high humidity conditions, the back coat layers rarely separate and thus have good thermal stability. The mediums of the invention are also excellent in dropout defects, thus leading to good recording and reproducing characteristics.

In contrast, the medium of Comparative Example 3 in which the vinyl chloride resin free of any epoxy group is used had a considerable degree of defects on the back coat layer when repeatedly run and a slight degree of contamination of the guide pins. Thus, the durability and wear resistance of the back coat layer are not good.

In addition, the coefficient of dynamic friction is so large that the runnability is poor. Also, the thermal stability of the back coat layer is poor. The medium of Comparative Example 3 involves a number of dropout defects and is thus poor in recording and reproducing characteristics.

With the mediums of Comparative Examples 4 and 5 in which ordinary vinyl chloride/vinyl acetate copolymer and vinyl chloride/vinyl acetate/vinyl alcohol copolymers are, respectively, used, the durability, wear resistance and thermal resistance of the respective back coat layers are poor with poor runnability. In addition, a great number of the dropout defects are produced. The use of the phenoxy resin instead of the vinyl chloride resin is not good with respect to the durability, wear resistance, thermal stability and runnability of the back coat layer. The dropout defects are also produced in a great number.

What is claimed is:

1. A magnetic recording medium which comprises a nonmagnetic support and a magnetic recording layer formed on one side of the support and made of a magnetic powder uniformly dispersed in a binder resin and having a size of from 0.01 to 0.5 micrometers, said binder resin comprising (a) a vinyl chloride resin consisting essentially of vinyl chloride units, from 0.1 to 4.0 weight percent of an —SO$_3$M group or —OSO$_3$M group, in which M represents a monovalent metal or a NH$_4$ group, and from 0.5 to 40 weight percent of an epoxy group in the molecule, said vinyl chloride resin having an average degree of polymerization of from 200 to 600 and being used in an amount of from 10 to 40 parts by weight per 100 parts by weight of said magnetic powder, and (b) at least one member selected from the group consisting of fatty acids having a saturated or unsaturated hydrocarbon group containing from 8 to 18 carbon atoms, fatty acid esters of fatty acids having a saturated or unsaturated hydrocarbon group containing from 8 to 18 carbon atoms and fatty alcohols having a saturated or unsaturated hydrocarbon group containing from 3 to 12 carbon atoms, and phosphoric acid esters of the following formulae

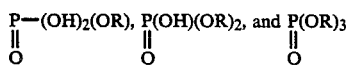

in which each R represents a saturated or unsaturated hydrocarbon group having from 3 to 16 carbon atoms, said at least one member being used in an amount of from about 0.1 to 10 parts by weight per 100 parts by weight of the magnetic powder and from about 1 to 25 parts by weight per 100 parts by weight of the vinyl chloride resin.

2. A magnetic recording medium according to claim 1, wherein said binder resin consists of the vinyl chloride resin.

3. A magnetic recording medium according to claim 1, wherein said vinyl chloride resin is a vinyl chloride/allyl glycidyl ether copolymer having an epoxy group and an —OSO$_3$M group.

4. A magnetic recording medium according to claim 1, wherein said vinyl chloride resin is a vinyl chloride/glycidyl acrylate copolymer having an epoxy group and an —SO$_3$M group.

5. A magnetic recording medium according to claim 1, wherein said vinyl chloride resin is a vinyl chloride/metallyl glycidyl ether copolymer having an epoxy group and an —OSO$_3$M group.

6. A magnetic recording medium according to claim 1, wherein said at least one member is a fatty acid having a saturated or unsaturated hydrocarbon group containing from 8 to 18 carbon atoms.

7. A magnetic recording medium according to claim 1, wherein said at least one member is a fatty acid ester.

8. A magnetic recording medium according to claim 1, wherein said at least one member is a phosphoric acid ester of the formula,

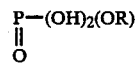

in which R represents a saturated or unsaturated hydrocarbon group having from 3 to 16 carbon atoms.

9. A magnetic recording medium according to claim 1, wherein said at least one member is a phosphoric ester of the formula,

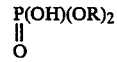

in which each R represents a saturated or unsaturated hydrocarbon group having 3 to 16 carbon atoms.

10. A magnetic recording medium according to claim 1, wherein said at least one member is a phosphoric acid ester of the formula,

in which R represents a saturated or unsaturated hydrocarbon group having from 3 to 16 carbon atoms.

11. A magnetic recording medium according to claim 1, wherein said medium is a magnetic tape and has a back coat layer on the other side of the support, said back coat layer being made of a composition which comprises a vinyl chloride resin having an —SO$_3$M or —OSO$_3$M group, in which M represents a monovalent metal or a NH$_4$ group, and an epoxy group in the molecule.

12. A magnetic recording medium according to claim 11, wherein said composition consists of the vinyl chloride resin.

13. A magnetic recording medium according to claim 11, wherein said vinyl chloride resin has from 0.1 to 4.0 wt % of an —SO$_3$M group and from 0.5 to 40 wt % of an epoxy group.

14. A magnetic recording medium according to claim 11, wherein said vinyl chloride resin has from 0.1 to 4.0 wt % of an —OSO$_3$M group and from 0.5 to 40 wt % of an epoxy group.

15. A magnetic recording medium according to claim 11, wherein said vinyl chloride resin is a vinyl chloride/allyl glycidyl ether copolymer having an epoxy group and an —OSO$_3$M group.

16. A magnetic recording medium according to claim 11, wherein said vinyl chloride resin is a vinyl chloride/glycidyl acrylate copolymer having an epoxy group and an —SO$_3$M group.

17. A magnetic recording medium according to claim 11, wherein said vinyl chloride resin is a vinyl chloride/methallyl glycidyl ether copolymer having an epoxy group and an —OSO₃M group.

18. A magnetic recording medium according to claim 11, wherein said vinyl chloride resin has an average degree of polymerization of from 200 to 600.

19. A magnetic recording medium according to claim 11, wherein said back coat layer further comprises at least one member selected from the group consisting of fatty acids having a saturated or unsaturated hydrocarbon group containing from 8 to 18 carbon atoms, fatty acid esters of fatty acids having a saturated or unsaturated hydrocarbon group containing from 8 to 18 carbon atoms and fatty alcohols having a saturated or unsaturated hydrocarbon group containing from 3 to 12 carbon atoms, and phosphoric acid esters of the following formulae $$\underset{O}{\overset{\|}{P}}-(OH)_2(OR), \quad \underset{O}{\overset{\|}{P}}(OH)(OR)_2, \text{ and } \underset{O}{\overset{\|}{P}}(OR)_3$$

in which each R represents a saturated or unsaturated hydrocarbon group having from 3 to 16 carbon atoms.

20. A magnetic recording medium according to claim 19, wherein said at least one member is used in said back coat layer in an amount of from 1 to 25 parts by weight per 100 parts by weight of the vinyl chloride resin.

21. A magnetic recording medium according to claim 11, wherein said back coat layer further comprises carbon black in an amount of 50 to 500 parts by weight per 100 parts by weight of the vinyl chloride resin.

* * * * *